US008954415B2

(12) United States Patent
Bubeck et al.

(10) Patent No.: US 8,954,415 B2
(45) Date of Patent: Feb. 10, 2015

(54) WEB DISCOVERY METHOD FOR ASSESSING INGREDIENTS FOR REGULATORY COMPLIANCE

(71) Applicant: Ithos USA Inc., Troy, NY (US)

(72) Inventors: Kenneth Bruce Bubeck, Delmar, NY (US); Joseph Coyne, Houston, TX (US); Hong Wei Chou, Boston, MA (US)

(73) Assignee: Ithos USA Inc., Troy, NY (US)

( * ) Notice: Subject to any disclaimer, the term of this patent is extended or adjusted under 35 U.S.C. 154(b) by 0 days.

(21) Appl. No.: 13/936,282

(22) Filed: Jul. 8, 2013

(65) Prior Publication Data

US 2013/0297616 A1    Nov. 7, 2013

Related U.S. Application Data

(62) Division of application No. 13/029,262, filed on Feb. 17, 2011, now Pat. No. 8,484,183.

(51) Int. Cl.
*G06F 17/30* (2006.01)

(52) U.S. Cl.
CPC .... *G06F 17/30283* (2013.01); *G06F 17/30672* (2013.01); *G06F 17/30696* (2013.01)
USPC ........... 707/706; 707/713; 707/722; 707/736; 707/758; 707/781

(58) Field of Classification Search
CPC ...................................................... G06F 17/30
USPC .................................................. 707/600–899
See application file for complete search history.

(56) References Cited

U.S. PATENT DOCUMENTS

| 7,769,712 B2 | 8/2010 | Waldo et al. |
| 2008/0177717 A1* | 7/2008 | Kumar et al. ..................... 707/4 |
| 2010/0005060 A1 | 1/2010 | Shebanow |

OTHER PUBLICATIONS

Isaac M. Woo, USPTO Office Action, U.S. Appl. No. 13/029,262, Mail Date Sep. 4, 2012, 7 pages.
Isaac M. Woo, USPTO Notice of Allowance, U.S. Appl. No. 13/029,262, Date Mailed Mar. 11, 2013, 20 pages.
IEEE Xplore Digital Library, Print Date Mar. 4, 2013, 3 pages.
ACM Digital Library, Print Date Mar. 4, 2013, 1 page.

* cited by examiner

*Primary Examiner* — Isaac M Woo
(74) *Attorney, Agent, or Firm* — Maxine L. Barasch; Keohane & D'Alessandro PLLC (57) ABSTRACT

A regulatory information retrieval system is disclosed. In one embodiment, the method comprises building ingredient data for manufacturing businesses. Then, those ingredients are compared with regulatory requirements. Relevant requirements are identified regarding permitted usage are extracted and converted to a guideline document. The guideline document can be viewed in a variety of ways, such as a detailed view, or an overview of repositories searched. The guidelines may then be converted to a file format that can be imported by other business applications.

20 Claims, 9 Drawing Sheets

| RELEVANT PHRASE | COUNTRY | DATE | SOURCE |
|---|---|---|---|
| "Pure " or" 100% pure " cannot be used on the label of a reconstituted product if any optional ingredient such as sodium benzoate, sugar, color, vitamin C, etc., is incorporated into the concentrate. | USA | 2010 | EAFUS - FDA |

WEB DISCOVERY METHOD FOR ASSESSING INGREDIENTS FOR REGULATORY COMPLIANCE

CROSS-REFERENCE TO RELATED APPLICATION

The present patent document is a division of U.S. patent application Ser. No. 13/029,262, filed Feb. 17, 2011, entitled "AUTOMATED REGULATORY GUIDELINE MANAGEMENT SYSTEM", the disclosure of which is incorporated herein by reference.

FIELD OF THE INVENTION

The present invention relates generally to information retrieval.

BACKGROUND

Businesses such as food manufacturers, cosmetic companies, and the like, have a need to manage many ingredients and formulas for manufacture of their products. There are many regulations pertaining to most of these ingredients, and the regulations vary in different countries. Keeping track of such regulations is a time-consuming and costly activity for these businesses. Therefore, it is desirable to have an improved regulatory information retrieval system to reduce the time and cost associated with these activities.

SUMMARY

Embodiments of the present invention provide systems and method for identifying regulator and customer restrictions pertaining to various substances, and the creation of file format guidelines for managing changes to those restrictions. There are various repositories available on the Internet, such as from the US Food and Drug Administration (FDA), and similar organizations in other countries. Much of this information can be "crawled" by a search engine which retrieves this information, and indexes it for fast retrieval. However, there are other documents that are not in text form. These may be TIFF files, graphic PDF files, or other formats. In some cases, these may undergo Optical Character Recognition (OCR) to convert the graphic images to text for storage.

In addition to retrieving relevant passages based on search terms, embodiments of the present invention apply a thesaurus to search terms to further expand the search. This allows identification of relevant passages that may not use the exact words of the search term. For example, acetylsalicylic acid also commonly is referred to as "aspirin." Hence, a search regarding regulations for acetylsalicylic acid may also retrieve information citing "aspirin" as relevant.

Embodiments of the present invention also apply emphasis to important words in the relevant passages. These important words may comprise "regulatory words" which help identify important rules and restrictions within the relevant passages.

The collection of relevant passages with emphasized words is used to comprise a guideline. The guideline is a form and the collection of an intelligent search result that provides a user with important information regarding a particular substance, identifying the categories of use, and the applicable restrictions. The user may optionally enter other parameters regarding his/her use of the substance prior to the search. These parameters may include, but are not limited to, the type of application (e.g. food, cosmetic, etc . . . ), the geographic location (e.g. U.S., Canada, Europe, etc . . . ), and the intended age range of usage (e.g. a children's medicine, adult product, etc . . . ). These parameters help focus the search to retrieve relevant regulations (e.g. for the proper countries), applications (such as cosmetics), and age groups. For example, a user planning to use an ingredient for a children's shampoo to be sold in Europe needs to refer to pertinent regulations for that situation.

Furthermore, the guideline information can be formatted into a data format, such as CSV (comma separated value) such that it may be imported into a third party program such as a formulation management system, or a spreadsheet application. In this way, the guideline information can be integrated into existing information systems.

In one embodiment, the method comprises building ingredient data for manufacturing businesses. Then, those ingredients are compared with regulatory requirements. Relevant requirements are identified regarding permitted usage, which then are extracted and converted to a guideline document. The guideline document can be viewed in a variety of ways, such as a detailed view, or an overview of repositories searched. The guidelines may then be converted to a file format that can be imported by other business applications.

The guidelines may include a variety of metadata that is part of the file format (e.g. CSV) that is imported into a third party software package. This metadata may include, but is not limited to:

An automatically generated reference number for the guideline;
Packaging and labeling restrictions;
Date of the regulation;
Author (source) of the regulation;
Country of the regulation;
Formulation restriction on composition percentages; and
Shelf life.

This metadata may be entered manually, or where possible, automatically populated. For example, when retrieving data from an FDA website, it is known that the country of the regulation is the United States, and the Author (source) of the regulation is the FDA.

Embodiments of the present invention also provide a method for generating viewable reports that display collected content on ingredient compliance. Fields are mapped to the guideline data structure so it can be fetched and displayed in these reports. A file can be exported summarizing this viewable report.

Embodiments of the present invention also provide a method for retrieving regulatory information. The method comprises indexing a plurality of regulatory corpuses, thereby forming a plurality of full-text searchable databases; receiving a search query comprising at least one search term; executing the search query on the plurality of full-text searchable databases to identify a plurality of relevant passages; emphasizing search terms within the plurality of relevant passages; and emphasizing regulatory words within the plurality of relevant passages, thereby forming emphasized relevant passages.

DETAILED DESCRIPTION

Figure 1:
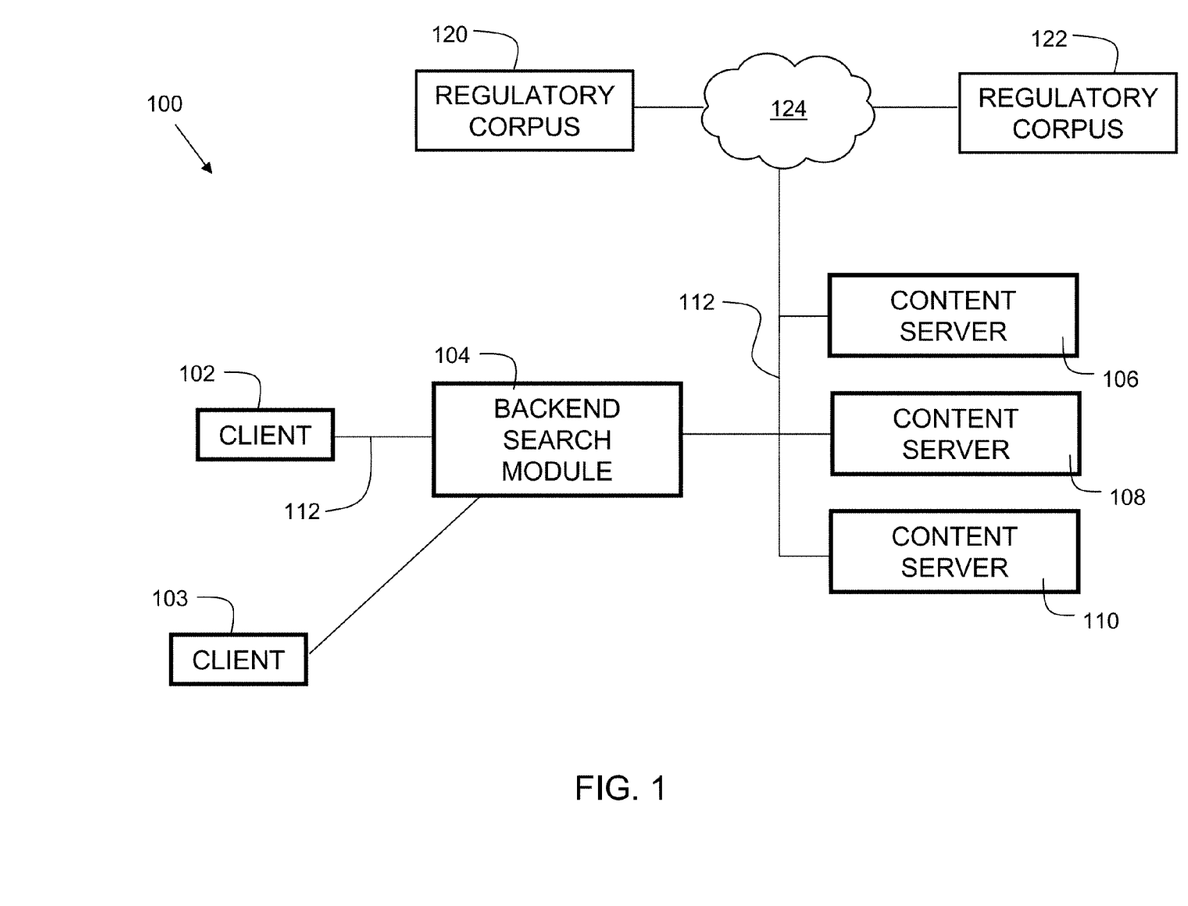
FIG. 1 shows a block diagram of a system in accordance with an embodiment of the present invention.

FIG. 1 shows a block diagram of a system 100 in accordance with an embodiment of the present invention. System 100 interacts with one or more client devices (examples shown as 102 and 103), which may be a personal computer or other suitable platform for running a client device. In one embodiment, the client device 102 is a computer that executes a browser to render a so-called "web-based" user interface. The client device communicates with a backend search module 104. The backend search module 104 receives search requests from client device 102 and in turn, sends the search request to a plurality of content servers (indicated as 106, 108, and 110). While three content servers (106, 108, 110) are shown in FIG. 1, embodiments of the present invention may have more or fewer content servers.

The content servers (106, 108, 110) each comprise one or more databases. Each content server performs a search on the data in the databases using the search query that is communicated from the client device 102. The results of the search are then sent back to the backend search module 104 which then sends the results to the client device 102. The content servers (106, 108, 110), backend search module 104, and client device 102 are devices comprising a processor, and non-transitory computer storage which contains machine instructions, that when executed by the processor, perform methods disclosed herein. These devices are interconnected via communications network 112. In one embodiment, communications network 112 may include the Internet 124. Other embodiments may comprise multiple client devices, such as client device 103. Hence, embodiments of the present invention may support multiple simultaneous users. The content servers (106, 108, 110) build internal, searchable databases based on existing regulatory corpuses 120 and 122. In practice, there may be many such regulatory corpuses. In one embodiment, the regulatory corpuses may include regulations available on the Internet from the US Food and Drug Administration, and counterpart agencies internationally.

Figure 2:
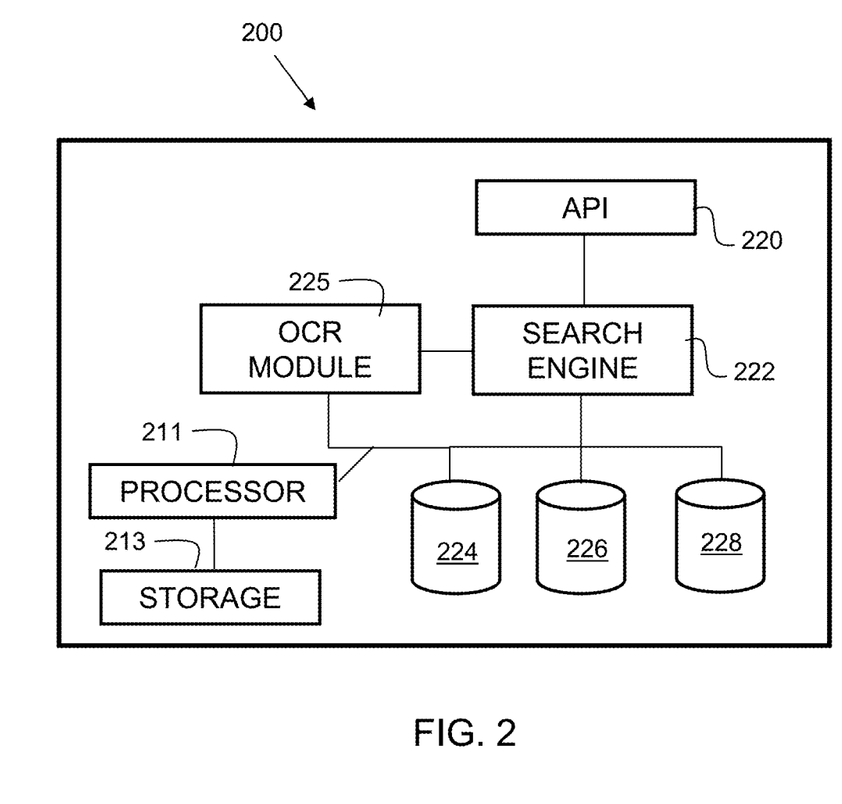
FIG. 2 shows details of a server used in the embodiment of FIG. 1.

FIG. 2 shows details of a content server 200 used in the embodiment of FIG. 1. Architecturally, content server 200 is similar to content servers (106, 108, 110) of FIG. 1. Content server 200 comprises a processor 211, and non-transitory computer storage 213 which contains machine instructions, that when executed by the processor, perform methods disclosed herein. Content server 200 comprises multiple repositories (224, 226, 228). Each repository is a full text searchable repository, which is searched by search engine 222. In one embodiment, search engine 222 is comprised of a fully inverted indexing system, such as Livelink Discovery Server by Open Text Corporation. Application Programming Interface (API) module 220 interfaces with the backend search module 104. It receives search queries from the backend search module 104 and, upon completion of execution of the search queries, communicates search results to the backend search module 104 for dissemination to client devices (see 102, 103 of FIG. 1). In one embodiment, API module 220 is implemented via PHP. In another embodiment, the API module 220 is implemented via dot Net framework.

Optionally, an embodiment may further comprise Optical Character Recognition (OCR) module 225. In some cases, relevant documents from Internet sources may not be in a text-searchable form, and may comprise graphics files such as TIFF files or PDF files with no searchable text. In this case, OCR module 225 performs an OCR process to convert information to text, such that it may be stored in one or more of the repositories (224, 226, 228).

Figure 3:
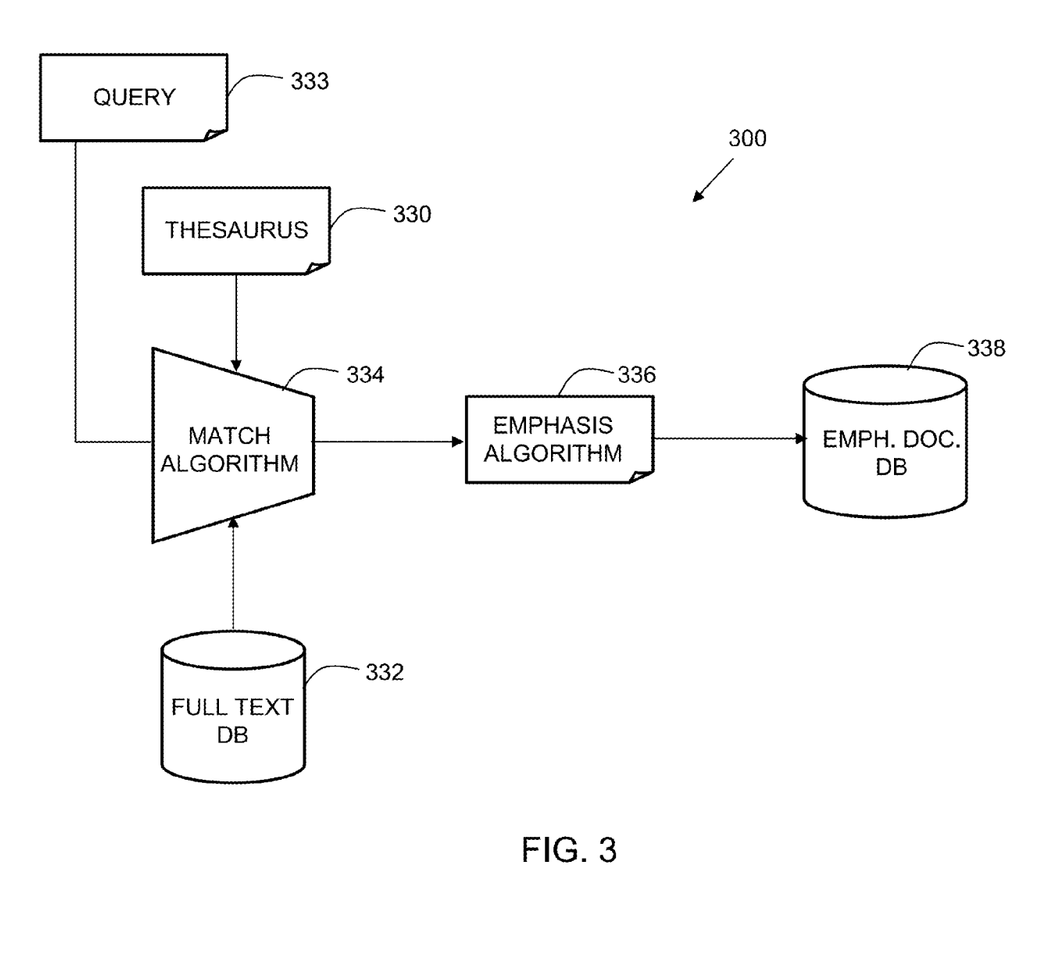
FIG. 3 is a flowchart outlining a method in accordance with an embodiment of the present invention.

FIG. 3 is a flowchart 300 outlining a method in accordance with an embodiment of the present invention. When a search query 333 is processed, the search query 333, full-text database 332, and thesaurus 330 provide input to match algorithm 334. Match algorithm 334 compares the terms from query 333 with entries in full-text database 332. Synonyms for the query terms are derived from the thesaurus 330. For example, given a search query 333 with the term "aspirin," the thesaurus 330 is checked for synonyms, and may return alternative terms, such as "acetylsalicylic acid," and "ASA." These terms are also used to form a "synonym search query," which is then used to search full-text database 332 to collect addition relevant results.

Documents and passages within full-text database 332 that match the search query from the original terms or synonyms are input to the emphasis algorithm 336. The emphasis algorithm 336 highlights important terms within the relevant passages and documents supplied by match algorithm 334, thereby creating emphasized relevant passages. The emphasis algorithm 336 highlights the terms and related synonyms from the search query 333. Emphasis algorithm 336 may provide emphasis (e.g. via boldface font, colors, underlining, highlighting, or a combination thereof), for important words in a regulatory context. These "regulatory words" may include, but are not limited to: Shall, must, can, may, cannot, allow, permit, require, prohibit, ban, forbid.

Other words may also be included or omitted, depending on the application. The emphasis algorithm 336 may apply the regulatory words with a stemming process, such that "stemmed regular words," which are various tenses of the words, also get highlighted. For example, with the regulatory word "prohibit," it is also possible to highlight stemmed regulatory words such as "prohibiting" and "prohibited" by applying a word stemming process. The output of the emphasis algorithm is an emphasized document database (EDD) 338 that comprises the relevant documents and/or passages from the full-text database 332 with the search terms, synonyms, and regulatory words emphasized. The EDD is then used as source material for generating guidelines for various substances. In one embodiment, the EDD is converted into a CSV (comma separated value) file, such that it may be imported into a formulation management software package, such as Optiva. The fields within the CSV file may include, but are not limited to, an automatically generated reference number for the guideline, packaging and labeling restrictions, date of the regulation, author of the regulation, country of the regulation, formulation restriction on composition percentages, and shelf life.

Figure 4:
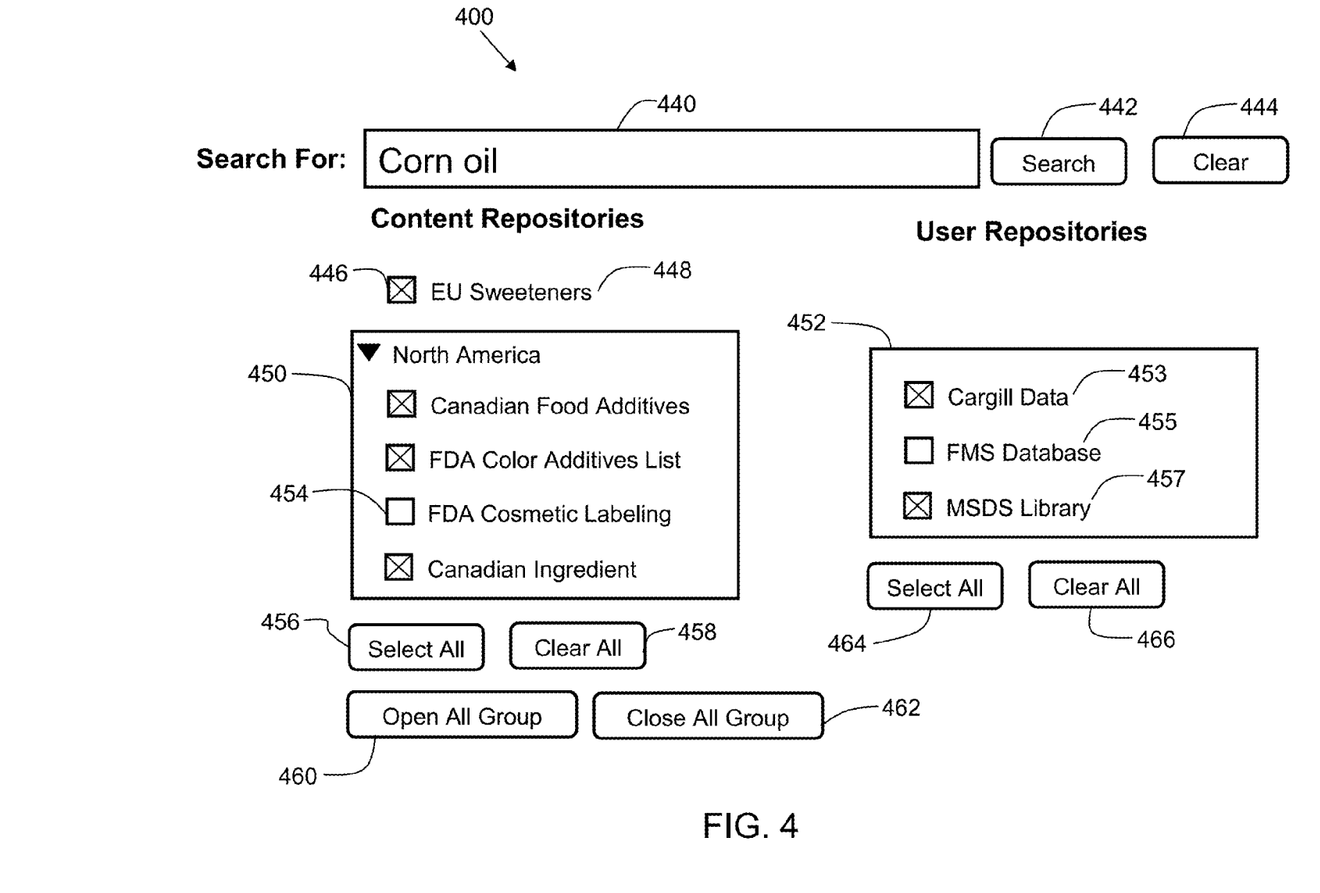
FIG. 4 shows an example of a search entry user interface.

FIG. 4 shows an example of a search entry user interface 400. User interface 400 comprises a search text entry field 440, where the user enters search query terms. In FIG. 4, the search term "Corn oil" is entered into text field 440, as an example. Prior to performing the search, the user may select repositories to search from a plurality of content repositories and user repositories. Content repositories are typically information repositories available on the Internet, such as US FDA websites, or other regulatory bodies internationally.

Content repository 448, which is "EU Sweeteners" is selected to be searched by selecting checkbox 446. To skip searching a repository, it is unchecked, as shown with checkbox 454. Since checkbox 454 is not selected, the corresponding repository (FDA Cosmetic Labeling) is not searched. In one embodiment, repositories are grouped by geographical location. For example, group 450 comprises repositories covering North America. Select All button 456 enables a user to select all the repositories in a selected group. Similarly, Clear All button 458 enables a user to clear all the repositories in a selected group. Open All Group button 460 expands all groups to reveal the repositories contained within the groups. Similarly, Close All Group button 462 collapses all the groups.

User repositories section 452 contains local databases acquired by the user. Select All button 464 and Clear All button 466 allow for easy selection or de-selection of the user repositories 453, 455, and 457.

Once the user has selected the desired content repositories and user repositories, the search can be initiated with the invocation of the Search button 442. The Clear button 444 clears the search text entry field 440.

Figure 5:
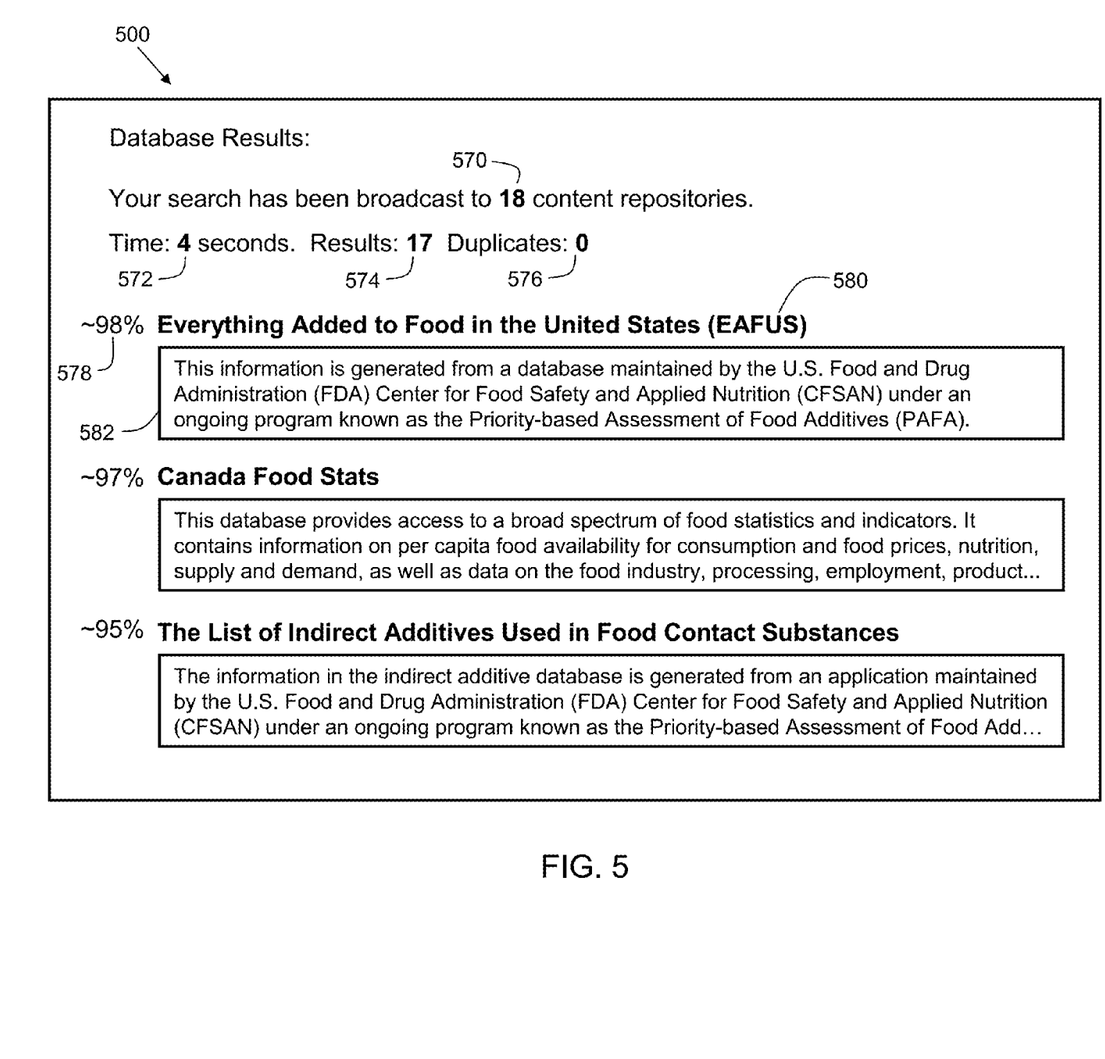
FIG. 5 shows an example of a repository listing user interface.

FIG. 5 shows an example of a repository listing user interface 500. Repository listing user interface 500 is one of multiple ways to view search results. Repository listing user interface 500 shows the most relevant repositories for a given search query. For each repository presented, a title 580 is displayed, along with a relevancy score 578, and a text description field 582, which contains a description of the repository.

The number of repositories searched is displayed in field 570. The time the search took is shown in field 572. The number of search results is displayed in field 574. The number of duplicates in the repository list is shown in field 576.

Figure 6:
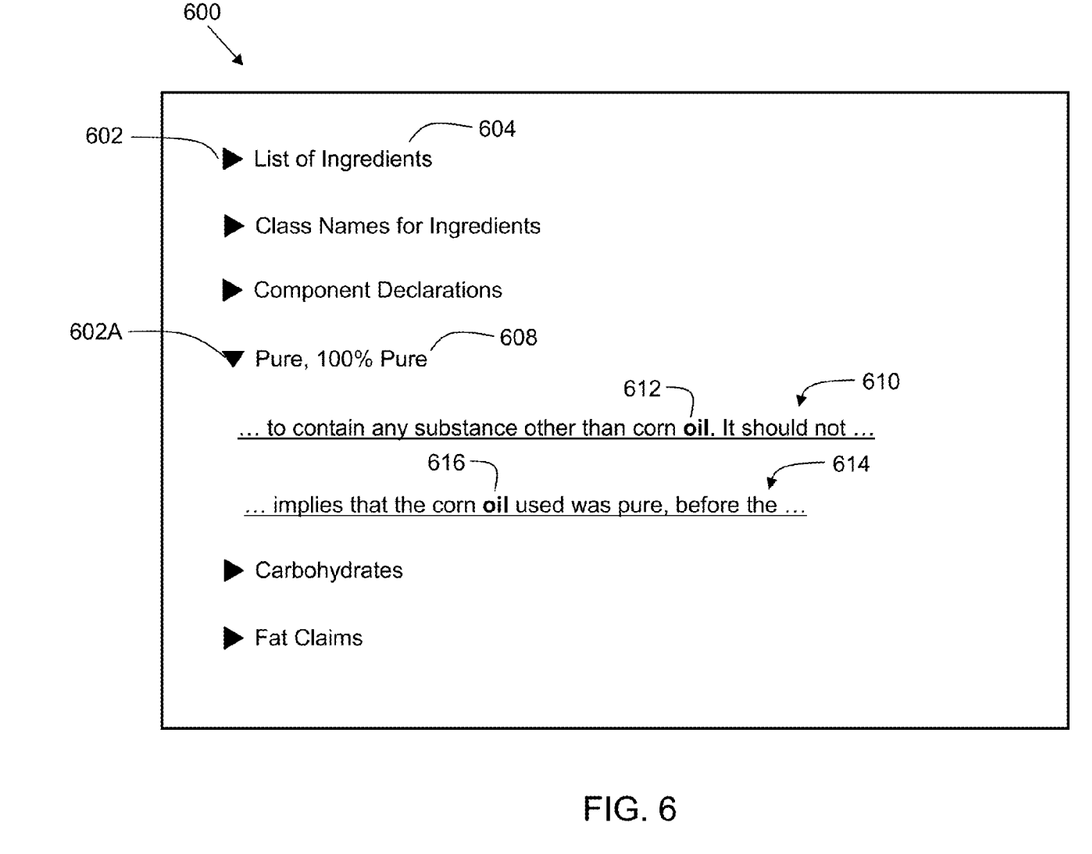
FIG. 6 shows an example of a detailed repository search results user interface.

FIG. 6 shows an example of a detailed repository search results user interface 600. User interface 600 shows various types of documents that were searched. Each document has a type field 604, and an expansion control 602. The expansion control 602A is selected to show relevant phrases 610 and 614 from documents within type "Pure, 100% Pure" as indicated for type field 608. Within the relevant phrases 610 and 614, relevant keywords, such as "oil," are highlighted, as shown by reference numbers 612 and 616.

Figure 7:
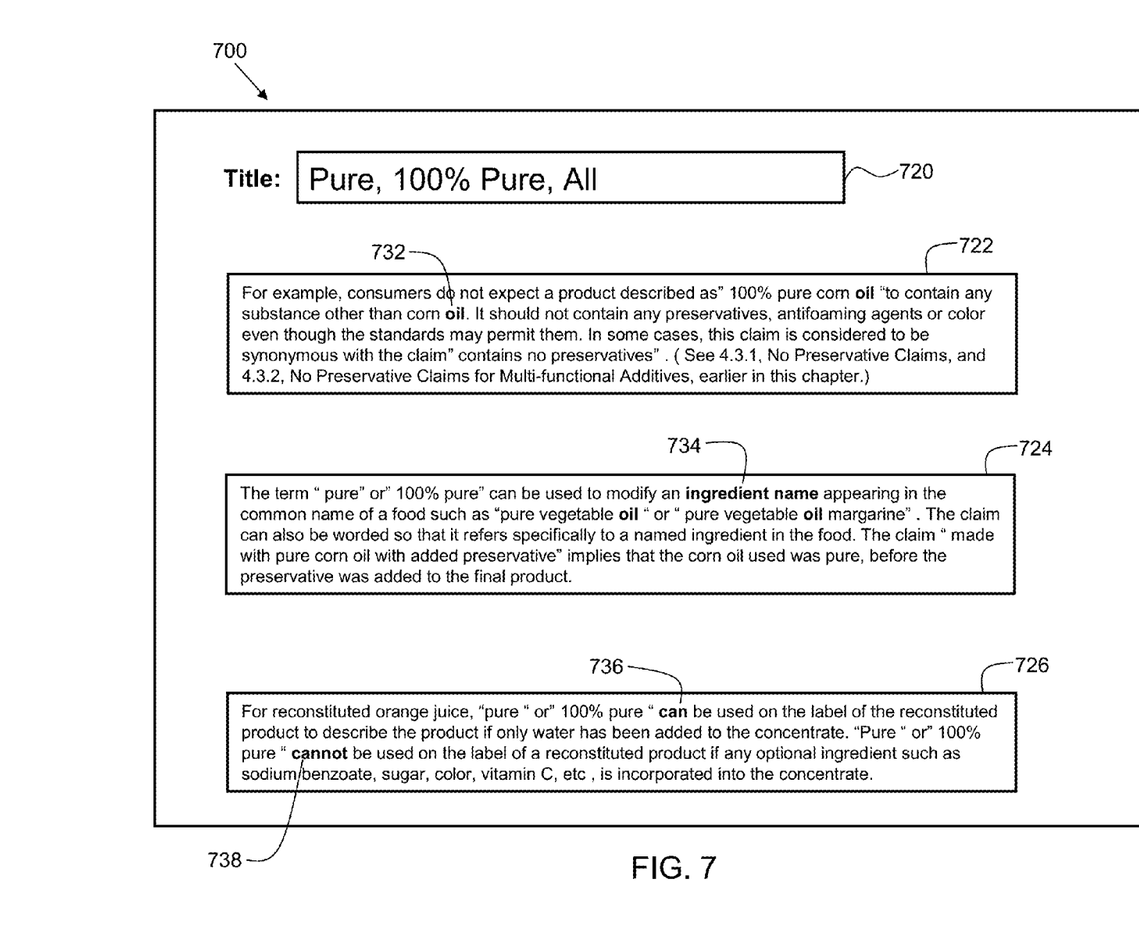
FIG. 7 shows an example of a repository document view user interface.

FIG. 7 shows an example of a repository document view user interface 700. Title field 720 shows the document type where the text passages 722, 724, and 726 originated from. Highlighted terms 732, 734, 736, and 738 emphasize important information for the user. These words are emphasized by the emphasis algorithm (see 336 of FIG. 3).

Figure 8:
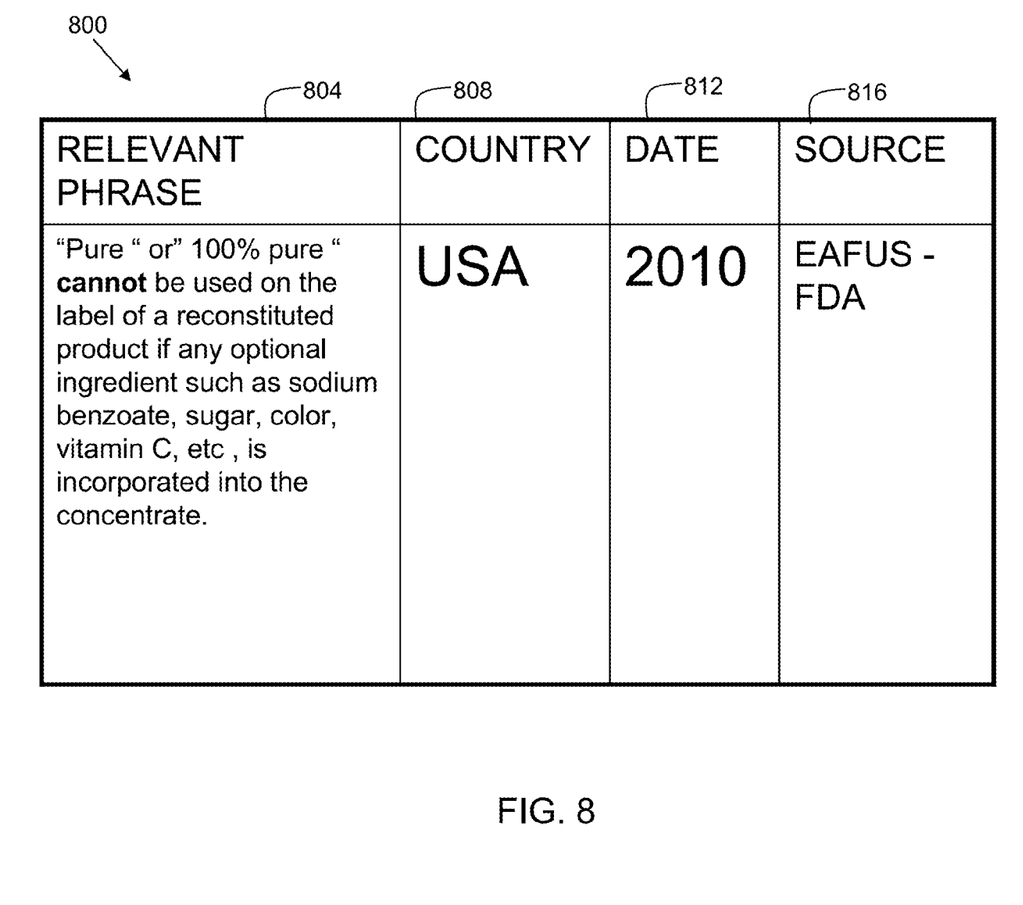
FIG. 8 shows an example of a relevant phrase and associated metadata.

FIG. 8 shows an example of a relevant phrase and associated metadata as organized in data format 800. Field 804 contains a relevant phrase that is based on a user's search query. Field 808 is the country of origin for the relevant phrase. Field 812 is the date of the document containing the relevant phrase. Field 816 is the source of the relevant phrase, which may be the name of the repository and/or issuing organization. Note that while shown in tabular format in FIG. 8, those skilled in the art will realize that a variety of file formats are possible, such as CSV, binary data format, or relational database format.

Figure 9:
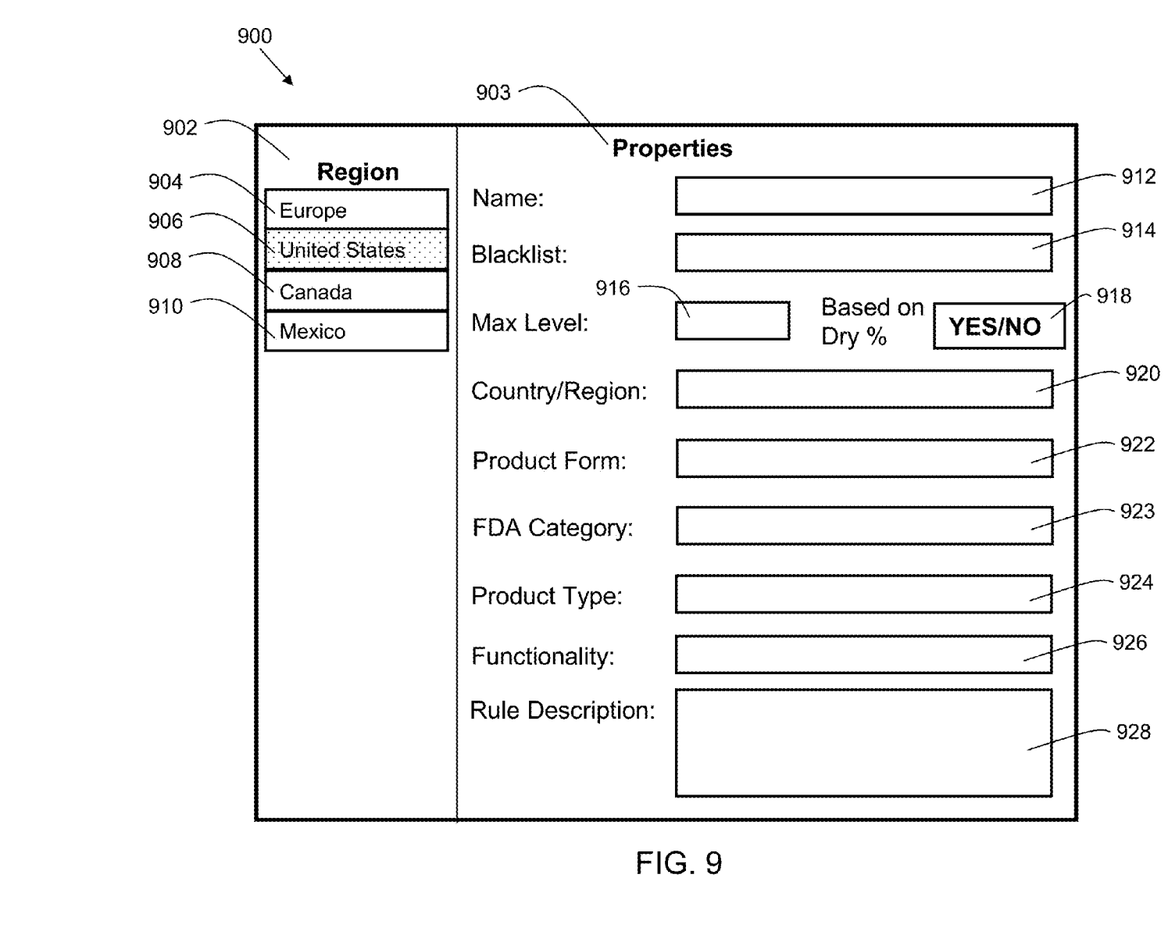
FIG. 9 shows an example of an automated guideline view user interface.

FIG. 9 shows an example of an automated guideline view user interface 900. On the left side of user interface 900 is the region list 902 which comprises one or more geographical regions. In user interface 900, four such regions are shown: 904 (Europe), 906 (US), 908 (Canada), and 910 (Mexico). In FIG. 9, region 906 (US) is highlighted. On the right side of user interface is the properties section 903. Properties section 903 contains information for a particular substance for a highlighted region (in this case, the United States). Field 912 contains the name of the substance. Field 914 contains blacklist information for the substance. Field 916 contains the maximum level for the substance. YES/NO field 918 indicates either "YES" or "NO" as to if the maximum level is based on dry percentage. Field 920 indicates the country or region to which the information within properties section 903 applies. Field 922 indicates the form of the product. Field 923 indicates the FDA category and subcategory. Field 924 indicates the product type. Field 926 indicates the functionality of the product. Field 928 indicates the rule description pertaining to the product. This may include limitations or special considerations for a substance, such as age restrictions, storage restrictions, labeling restrictions and packaging restrictions. All the constraints of a given substance, the categories of use and the restrictions within those categories are captured in user interface 900. This information may then be exported in the format of a data file such as a CSV file to a third party business application.

As can now be appreciated, embodiments of the present invention provide query broadcasting functionality to a wide variety of data sources, such as searchable web sites and local network data repositories like Sharepoint. This provides an even greater level of flexibility and customizability of the overall system, allowing a solution offering to best meet the needs of the customer and provide the most relevant data sources.

It will be recognized that the invention can take the form of an entirely hardware embodiment, an entirely software embodiment, or an embodiment containing both hardware and software elements. Furthermore, in some embodiments, the invention can take the form of a computer program product accessible from a computer-usable or computer-readable medium providing program code for use by or in connection with a computing system or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

Although the description above contains many specific details, these should not be construed as limiting the scope of the invention, but merely as providing illustrations of some of the presently preferred embodiments of the present invention. The present invention may have various other embodiments. Furthermore, while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A method for retrieving regulatory information, comprising:
    indexing a plurality of regulatory corpuses, thereby forming a plurality of full-text searchable databases;
    receiving a search query comprising at least one search term;
    retrieving one or more synonyms of the search terms from a thesaurus;
    forming a synonym search query for each retrieved synonym;

executing the search query and each synonym search query on the plurality of full-text searchable databases to identify a plurality of relevant passages;
emphasizing search terms within the plurality of relevant passages; and
emphasizing regulatory words within the plurality of relevant passages, thereby forming emphasized relevant passages.

2. The method of claim 1, further comprising:
presenting a list of databases;
a relevancy score for each database within the list of databases; and
a description of each database within the list of databases.

3. The method of claim 1, further comprising:
presenting a list of document types;
presenting an expansion control for each document type;
wherein relevant phrases from one of the document types from the list of document types is displayed in response to selection of the expansion control.

4. The method of claim 1, further comprising presenting said emphasized relevant passages.

5. The method of claim 1, further comprising:
performing optical character recognition on image files to generate converted text; and
inserting the converted text into at least one database belonging to the plurality of full-text searchable databases.

6. The method of claim 1, wherein emphasizing search terms within said relevant passages, and emphasizing regulatory words within said relevant passages, comprises rendering the search terms and regulatory words in a boldface font.

7. The method of claim 1, further comprising:
applying a stemming process to the regulatory words, thereby creating stemmed regulatory words; and
emphasizing the stemmed regulatory words in said relevant passages.

8. The method of claim 1, further comprising:
applying a stemming process to the search terms, thereby creating stemmed search terms; and
emphasizing the stemmed search terms in said relevant passages.

9. The method of claim 1, further comprising storing the emphasized relevant passages in a data file; and
storing associated metadata pertaining to each of the emphasized relevant passages in said data file.

10. The method of claim 9, wherein storing associated metadata comprises storing a date, author, and country for each emphasized relevant passage.

11. The method of claim 9, wherein storing the emphasized relevant passages in a data file comprises storing the emphasized relevant passages in a comma separated value formatted file.

12. The method of claim 1, wherein the regulatory words comprise at least one of the following:
shall;
must;
can;
may;
cannot;
allow;
permit;
require;
prohibit;
ban; and
forbid.

13. A method for retrieving regulatory information, comprising:
indexing a plurality of regulatory corpuses, thereby forming a plurality of full-text searchable databases;
receiving a search query comprising at least one search term;
executing the search query on the plurality of full-text searchable databases to identify a plurality of relevant passages;
emphasizing search terms within the plurality of relevant passages;
emphasizing regulatory words within the plurality of relevant passages, thereby forming emphasized relevant passages; and
storing the emphasized relevant passages in an emphasized document database.

14. The method of claim 13, wherein the regulatory words comprise at least one of the following:
shall;
must;
can;
may;
cannot;
allow;
permit;
require;
prohibit;
ban; and
forbid.

15. The method of claim 13, further comprising:
presenting a list of databases;
a relevancy score for each database within the list of databases; and
a description of each database within the list of databases.

16. The method of claim 13, further comprising:
presenting a list of document types;
presenting an expansion control for each document type;
wherein relevant phrases from one of the document types from the list of document types is displayed in response to selection of the expansion control.

17. The method of claim 13, further comprising presenting said emphasized relevant passages.

18. The method of claim 13, further comprising:
performing optical character recognition on image files to generate converted text; and
inserting the converted text into at least one database belonging to the plurality of full-text searchable databases.

19. The method of claim 13, further comprising:
applying a stemming process to the regulatory words, thereby creating stemmed regulatory words; and
emphasizing the stemmed regulatory words in said relevant passages.

20. The method of claim 13, further comprising storing the emphasized relevant passages in a data file; and
storing associated metadata pertaining to each of the emphasized relevant passages in said data file.

* * * * *